(12) United States Patent
Rabbat et al.

(10) Patent No.: US 11,995,888 B2
(45) Date of Patent: May 28, 2024

(54) ADAPTIVE CONTENT CLASSIFICATION OF A VIDEO CONTENT ITEM

(71) Applicant: Snap Inc., Santa Monica, CA (US)

(72) Inventors: Richard Rabbat, Palo Alto, CA (US); Ernestine Fu, Northridge, CA (US)

(73) Assignee: Snap Inc., Santa Monica, CA (US)

( * ) Notice: Subject to any disclaimer, the term of this patent is extended or adjusted under 35 U.S.C. 154(b) by 345 days.

(21) Appl. No.: 17/444,344

(22) Filed: Aug. 3, 2021

(65) Prior Publication Data

US 2021/0365689 A1     Nov. 25, 2021

Related U.S. Application Data

(63) Continuation of application No. 16/905,728, filed on Jun. 18, 2020, now Pat. No. 11,120,273.

(Continued)

(51) Int. Cl.
*G06V 20/40* (2022.01)
*G06F 18/40* (2023.01)
(Continued)

(52) U.S. Cl.
CPC .............. *G06V 20/40* (2022.01); *G06F 18/41* (2023.01); *G06T 11/00* (2013.01); *G06V 20/49* (2022.01);
(Continued)

(58) Field of Classification Search
CPC ...... G06V 20/40; G06V 20/49; G06V 30/248; G06V 30/2528; G06F 18/41; G06T 11/00
See application file for complete search history.

(56) References Cited

U.S. PATENT DOCUMENTS

| 6,424,789 B1 * | 7/2002 | Abdel-Mottaleb | G11B 27/034 |
| | | | 386/280 |
| 6,584,463 B2 * | 6/2003 | Morita | G11B 27/34 |
| | | | 715/721 |

(Continued)

FOREIGN PATENT DOCUMENTS

| CN | 101873414 A | * | 10/2010 | |
| CN | 104284173 A | * | 1/2015 | ........... G11B 27/034 |

(Continued)

OTHER PUBLICATIONS

Wang et al., Multimedia content analysis. (pp. 12-36). (Year: 2000).*

(Continued)

*Primary Examiner* — Manav Seth
(74) *Attorney, Agent, or Firm* — Schwegman Lundberg & Woessner, P.A.

(57) ABSTRACT

In a method for performing adaptive content classification of a video content item, frames of a video content item are analyzed at a sampling rate for a type of content, wherein the sampling rate dictates a frequency at which frames of the video content item are analyzed. Responsive to identifying content within at least one frame indicative of the type of content, the sampling rate of the frames is increased. Responsive to not identifying content within at least one frame indicative of the type of content, the sampling rate of the frames is decreased. It is determined whether the video content item includes the type of content based on the analyzing the frames.

18 Claims, 8 Drawing Sheets

Related U.S. Application Data (60) Provisional application No. 62/865,037, filed on Jun. 21, 2019.

(51) Int. Cl.
*G06T 11/00* (2006.01)
*G06V 30/24* (2022.01)

(52) U.S. Cl.
CPC ........ *G06V 30/248* (2022.01); *G06V 30/2528* (2022.01)

(56) References Cited

U.S. PATENT DOCUMENTS

| | | | | |
|---|---|---|---|---|
| 6,665,423 B1* | 12/2003 | Mehrotra | ............ | H04N 19/543 375/E7.111 |
| 7,003,154 B1* | 2/2006 | Peker | ................... | H04N 19/172 375/E7.181 |
| 7,203,380 B2* | 4/2007 | Chiu | ...................... | H04N 5/262 382/284 |
| 7,408,986 B2* | 8/2008 | Winder | .................. | H04N 5/145 348/E7.071 |
| 7,460,730 B2* | 12/2008 | Pal | ....................... | H04N 23/698 382/284 |
| 7,594,177 B2* | 9/2009 | Jojic | ..................... | G06F 16/739 715/721 |
| 7,760,956 B2* | 7/2010 | Lin | ........................ | G06V 20/40 382/254 |
| 8,064,638 B2* | 11/2011 | Fujibayashi | .......... | G06T 7/0002 382/103 |
| 8,074,162 B1* | 12/2011 | Cohen | ................... | G06Q 99/00 715/207 |
| 8,259,806 B2* | 9/2012 | Radhakrishnan | ..... | G06T 1/0028 375/240.15 |
| 8,385,663 B2* | 2/2013 | Xu | ....................... | G06V 10/7635 382/181 |
| 8,687,898 B2* | 4/2014 | Prokhorov | ............. | G06F 18/00 382/154 |
| 8,817,339 B2* | 8/2014 | Hinski | ................. | H04N 1/3876 358/473 |
| 8,843,424 B2* | 9/2014 | Mei | ..................... | G06F 18/2148 706/20 |
| 8,856,108 B2* | 10/2014 | Erol | ..................... | G06V 30/414 707/723 |
| 8,868,555 B2* | 10/2014 | Erol | ..................... | G06F 16/955 707/736 |
| 8,885,229 B1* | 11/2014 | Amtrup | ................ | G06V 30/224 358/1.18 |
| 8,897,554 B2* | 11/2014 | Lee | ....................... | G06V 10/50 382/165 |
| 9,087,297 B1* | 7/2015 | Filippova | ................ | G06F 16/70 |
| 9,141,860 B2* | 9/2015 | Vunic | .................. | G11B 27/034 |
| 9,160,696 B2* | 10/2015 | Wilsher | ................. | H04W 4/14 |
| 9,398,345 B2* | 7/2016 | Klappert | ............. | H04N 21/4316 |
| 9,462,054 B2* | 10/2016 | Poletto | .................. | H04L 67/535 |
| 9,639,772 B2* | 5/2017 | Lee | ....................... | G06V 10/56 |
| 9,672,626 B2* | 6/2017 | Peleg | ..................... | G11B 27/00 |
| 9,704,066 B2* | 7/2017 | Zhu | ....................... | G06F 18/24 |
| 9,747,527 B2* | 8/2017 | Baranowski | ...... | G06F 18/24323 |
| 9,756,091 B1* | 9/2017 | Davies | ................. | H04L 65/1089 |
| 9,848,229 B2* | 12/2017 | Kerns | ..................... | G06F 13/00 |
| 9,851,793 B1* | 12/2017 | van Hoff | ............. | G06F 3/04815 |
| 9,858,967 B1* | 1/2018 | Nomula | .................. | G10L 15/26 |
| 9,911,047 B2* | 3/2018 | Yamaji | .................. | G06V 20/46 |
| 10,217,021 B2* | 2/2019 | Roimela | .................. | G06T 7/73 |
| 10,242,007 B2* | 3/2019 | Blong | ...................... | G06F 16/44 |
| 10,262,233 B2* | 4/2019 | Takimoto | .............. | G06F 18/214 |
| 10,395,143 B2* | 8/2019 | Harary | ................... | G06N 20/00 |
| 10,402,698 B1* | 9/2019 | Tse | .......................... | G06V 20/41 |
| 10,540,537 B2* | 1/2020 | Rijnders | ................. | G06F 17/16 |
| 10,607,086 B1* | 3/2020 | Grady | .................... | G06V 40/161 |
| 10,691,202 B2* | 6/2020 | van Hoff | ............... | H04N 23/698 |
| 10,692,259 B2* | 6/2020 | Shah | ....................... | G06T 11/60 |
| 10,701,394 B1* | 6/2020 | Caballero | .............. | G06N 3/045 |
| 10,733,452 B2* | 8/2020 | Attorre | .................. | G10L 15/1815 |
| 10,795,549 B2* | 10/2020 | Drory | .................... | G06F 16/7867 |
| 10,943,255 B1* | 3/2021 | Andreou | ............ | G06Q 30/0244 |
| 10,977,520 B2* | 4/2021 | Turkelson | .............. | G06V 10/82 |
| 11,089,342 B1* | 8/2021 | Crane | .................... | H04N 5/272 |
| 11,120,835 B2* | 9/2021 | Ramaswamy | ........ | H04N 21/237 |
| 11,727,542 B2* | 8/2023 | Talbert | .................. | H04N 23/665 356/406 |
| 2002/0065651 A1* | 5/2002 | Kellner | .................. | G10L 15/183 704/E15.044 |
| 2003/0095720 A1* | 5/2003 | Chiu | ...................... | H04N 5/262 382/284 |
| 2006/0093040 A1* | 5/2006 | Zhang | .................... | G06F 16/786 348/700 |
| 2008/0013940 A1* | 1/2008 | Jung | ..................... | G03D 15/001 396/78 |
| 2009/0304082 A1* | 12/2009 | Radhakrishnan | ... | G06F 16/7834 375/240.15 |
| 2014/0324845 A1* | 10/2014 | Bronstein | ............. | G06F 16/447 707/812 |
| 2014/0362422 A1* | 12/2014 | Hinski | ................. | H04N 1/3876 358/474 |
| 2015/0318020 A1* | 11/2015 | Pribula | .............. | H04N 21/2743 386/290 |
| 2016/0217588 A1* | 7/2016 | Hay | ........................ | G06T 7/262 |
| 2016/0286266 A1* | 9/2016 | Moshitch | ............... | G06V 20/46 |
| 2016/0379139 A1* | 12/2016 | Eldar | .................... | G06F 16/285 706/12 |
| 2017/0278546 A1* | 9/2017 | Xiao | ....................... | G11B 27/34 |
| 2018/0336927 A1* | 11/2018 | Bradley | ............... | G11B 27/007 |
| 2019/0012774 A1* | 1/2019 | Arai | ..................... | G06V 10/764 |
| 2019/0108420 A1* | 4/2019 | Harary | ............. | G06F 18/24143 |
| 2019/0347484 A1* | 11/2019 | Sridhar | ................. | G06N 5/043 |
| 2020/0193165 A1* | 6/2020 | Grady | .................... | G06V 20/46 |
| 2020/0401813 A1 | 12/2020 | Rabbat et al. | | |
| 2020/0410691 A1* | 12/2020 | Brosch | ................. | G06T 7/0012 |

FOREIGN PATENT DOCUMENTS

| | | | | |
|---|---|---|---|---|
| CN | 105578089 A | * | 5/2016 | |
| CN | 109165573 A | * | 1/2019 | ......... G06K 9/00718 |
| CN | 109726765 A | * | 5/2019 | ......... G06K 9/00718 |
| WO | WO-2007019409 A2 | * | 2/2007 | ......... G06F 16/739 |
| WO | WO-2009006057 A2 | * | 1/2009 | ....... G06F 17/30843 |
| WO | WO-2020167581 A1 | * | 8/2020 | ......... G06K 9/00664 |

OTHER PUBLICATIONS

Ng et al., "Collages as Dynamic Summaries of Mined Video content for Intelligent Multimedia Knowledge Management" (pp. 1-10) (Year: 2003).*

U.S. Appl. No. 16/905,728, filed Jun. 18, 2020, Adaptive Content Classification of a Video Content Item.

"U.S. Appl. No. 16/905,728, Notice of Allowance dated May 12, 2021", 10 pgs.

* cited by examiner

ADAPTIVE CONTENT CLASSIFICATION OF A VIDEO CONTENT ITEM

RELATED APPLICATIONS

This application is a continuation of U.S. patent application Ser. No. 16/905,728, filed Jun. 18, 2020, which claims the benefit of priority to U.S. Provisional Application Ser. No. 62/865,037, filed Jun. 21, 2019, each of which are incorporated herein by reference in their entireties.

BACKGROUND

With the proliferation of media content available online, it is of increasing importance to quickly and efficiently classify the content appropriate, so that the content can be properly managed. For example, proper classification of content that is deemed not safe for work (NSFW) such as content including nudity, obscenity, or material that one might find offensive, is of paramount import so that content filters can block access to such content. In another example, media content including faces of celebrities may require tagging to make the content discoverable during search. Proper classification of media content including faces for facial recognition improves the searchability of such content.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "analyzing," "identifying," "determining," "combining," "applying," "forwarding," or the like, refer to the actions and processes of an electronic device such as: a processor, a processor, an optical sensor, a sensor, a memory, a mobile electronic device, a sensor processing unit, a sensor processor, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example computer system upon which embodiments of the present invention may be implemented. Examples of systems for performing adaptive content classification of a video content item are then described. Example operations for performing adaptive content classification of a video content item are then described.

Due to the immense volume of online video content, computer-implemented content classifiers are used to automate the classification of video content, according to the parameters of the content classifier. Content classifiers operate by analyzing images or frames of a video to identify a particular type of content. In some embodiments, video content is fed into multiple content classifiers, either sequentially or concurrently, to identify multiple types of content. In the event that a content classifier is not able to conclusively determine whether a video content item includes a particular type of content, the content classifier may be configured to forward such video content items to a human user for the determination. As human review of media content items is much slower than automated content classification, the efficacy of automated content classification is important to increase the speed at which content classification of video content items is performed.

Embodiments described herein provide video content items to at least one content classifier, where the content classifier is configured to automatically identify a particular type of content (e.g., NSFW content, cat videos, football videos, music videos, etc.) Frames of the video content are received at the content classifier, where the sampling rate of frames analyzed by the content classifier is adapted based on the analysis of at least one previous frame of the video content. For instance, rather than check every frame or every key frame of a video content item, the frequency of the frames that are analyzed is adapted based on the characteristics of at least one preceding frame. If a frame is given a low grade of including the particular type of content, the sample rate is increased (e.g., skipping ahead multiple frames or jumping ahead 0.5 seconds), and if a frame is given a high grade of including the particular type of content, the sample rate is decreased or maintained. In some embodiments, once enough frames of a video are indicative of a particular type of content, it is determined that the video content item includes the type of content, and the analysis for the video content item is ceased, allowing the content classifier to process a next video content item.

In accordance with various embodiments, methods and systems for performing adaptive content classification of a video content item, are described. Frames of a video content item are analyzed at a sampling rate for a type of content, wherein the sampling rate dictates a frequency at which frames of the video content item are analyzed. Responsive to identifying content within at least one frame indicative of the type of content, the sampling rate of the frames is increased. Responsive to not identifying content within at least one frame indicative of the type of content, the sampling rate of the frames is decreased. It then determined whether the video content item includes the type of content based on the analyzing the frames.

Embodiments described herein improve the speed of automated content classification by combining multiple frames of a video content item into a collage of frames, such that multiple frames can be classified according to a type of content concurrently. It should be appreciated that a matrix or collage of any size can be used (e.g., 2×2 frames, 3×3 frames, 4×2 frames, etc.) In some embodiments, the collage of frames is provided to the content classifier. Based on the analysis of the collage, the frames of the video content item selected for inclusion within the collage can be adapted. For instance, where the collage is analyzed and it is determined that the collage does not include the particular type of content, the sample rate of frames of the video content item included in the collage can be increased, such that more frames from the video content item are skipped. Where the collage is analyzed and it is determined that the collage includes the type of content, the sample rate of the college can be decreased or maintained such that a higher granularity of frames of the video content item are analyzed.

Embodiments described herein pertain to identification of visually similar video content items. In one embodiment, the video content item is a Graphics Interchange Format (GIF) file. While embodiments described herein pertain to GIF files, it should be appreciated that other types of prerecorded media files, such as other types of video files, can be used herein. Moreover, it should be appreciated that any type of media file format can be used in accordance with the described embodiments, including but not limited to GIF, WebM, WebP, MPEG-4 (MP4), Animated Portable Network Graphics (APNG), Motion JPEG, Flash video (FLV), Windows Media video, M4V, etc. It should be appreciated that video content item can be looped (e.g., via a HTML 5 video element or Flash video element) to automatically repeat. In some embodiments, the video content item is a short form looping video file (e.g., less than 60 seconds).

Embodiments described herein provide methods and systems for performing adaptive content classification of a video content item. Frames of a video content item are analyzed at a sampling rate for a type of content. In some embodiment, multiple frames are combined into a single frame (e.g., as a matrix or collage). Responsive to identifying content within at least one frame indicative of the type of content, the sampling rate of the frames is increased. Responsive to not identifying content within at least one frame indicative of the type of content, the sampling rate of the frames is decreased. It is determined whether the video content item includes the type of content based on the analysis of the frames.

As presented above, adaptive content classification of a video content item is important for facilitating the use of digital content. Providing search results that are appropriately classified, primarily in an automated manner, improves the performance of digital content search by providing accurate results. Moreover, by appropriately classifying NSFW content, sensitive content can be avoided for and kept out of search results for audiences that should not have access to such content.

Hence, the embodiments of the present invention greatly extend beyond conventional methods of content classification of video content items. Moreover, embodiments of the present invention amount to significantly more than merely using a computer to perform adaptive content classification. Instead, embodiments of the present invention specifically recite a novel process, rooted in computer technology, adapting the sampling rate of content classifiers based on intermediate results and/or combining multiple frames into a single frame, for providing accurate and computationally efficient content classification. Therefore, accurate search results can be provided for presentation to a user, improving the user experience.

Example Computer System and Communication Network

Figure 1A:
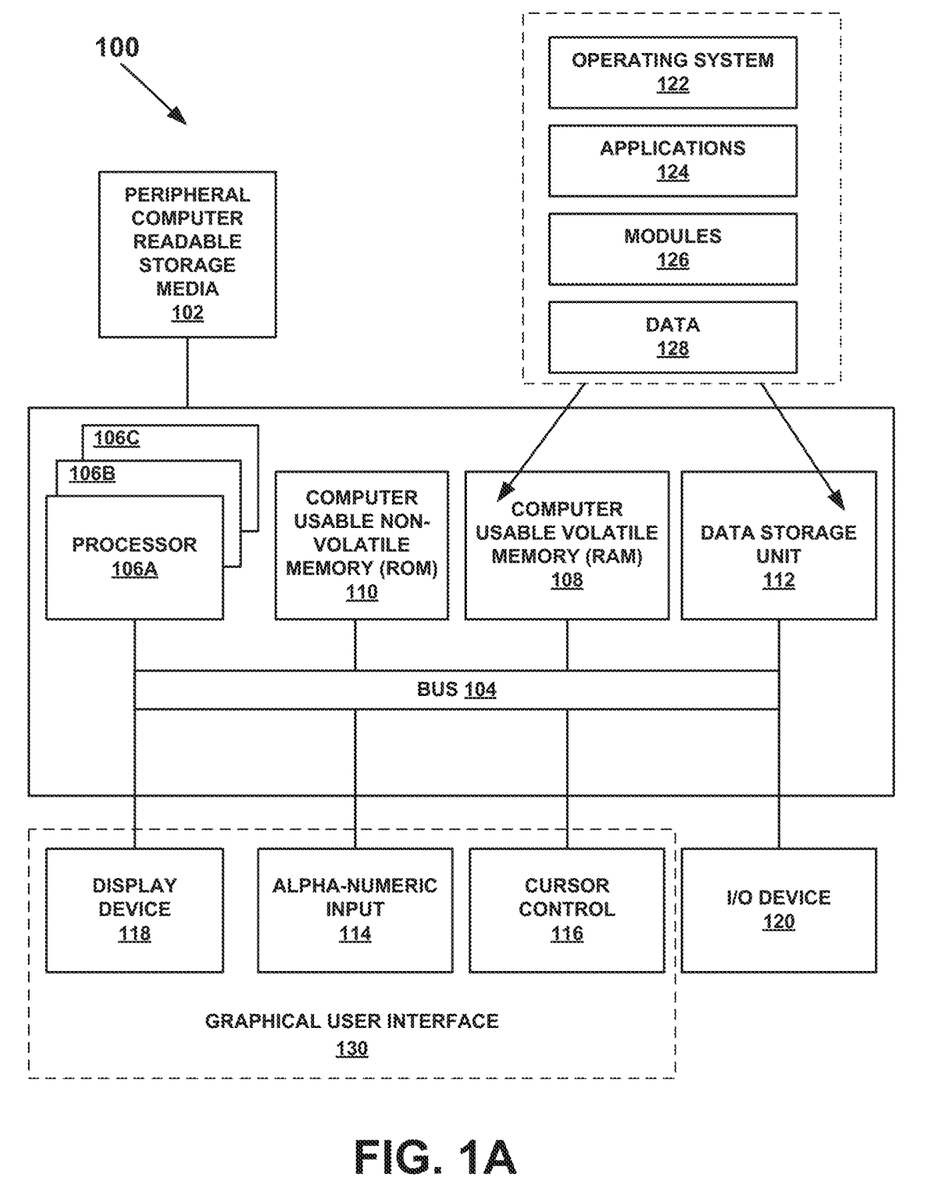
FIG. 1A illustrates an example computer system upon which embodiments described herein be implemented.

Turning now to the figures, FIG. 1A is a block diagram of an example computer system 100 upon which embodiments of the present invention can be implemented. FIG. 1A illustrates one example of a type of computer system 100 (e.g., a computer system) that can be used in accordance with or to implement various embodiments which are discussed herein.

It is appreciated that computer system 100 of FIG. 1A is only an example and that embodiments as described herein can operate on or within a number of different computer systems including, but not limited to, general purpose networked computer systems, embedded computer systems, mobile electronic devices, smart phones, server devices, client devices, various intermediate devices/nodes, stand alone computer systems, media centers, handheld computer systems, multi-media devices, and the like. In some embodiments, computer system 100 of FIG. 1A is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 100 of FIG. 1A includes an address/data bus 104 for communicating information, and a processor 106A coupled with bus 104 for processing information and instructions. As depicted in FIG. 1A, computer system 100 is also well suited to a multi-processor environment in which a plurality of processors 106A, 106B, and 106 are present. Conversely, computer system 100 is also well suited to having a single processor such as, for example, processor 106A. Processors 106A, 106B, and 106C may be any of various types of microprocessors. Computer system 100 also includes data storage features such as a computer usable volatile memory 108, e.g., random access memory (RAM), coupled with bus 104 for storing information and instructions for processors 106A, 106B, and 106C. Computer system 100 also includes computer usable non-volatile memory 110, e.g., read only memory (ROM), coupled with bus 104 for storing static information and instructions for processors 106A, 106B, and 106C. Also present in computer system 100 is a data storage unit 112 (e.g., a magnetic or optical disc and disc drive) coupled with bus 104 for storing information and instructions. Computer system 100 also includes an alphanumeric input device 114 including alphanumeric and function keys coupled with bus 104 for communicating information and command selections to processor 106A or processors 106A, 106B, and 106C. Computer system 100 also includes an cursor control device 116 coupled with bus 104 for communicating user input information and command selections to processor 106A or processors 106A, 106B, and 106C. In one embodiment, computer system 100 also includes a display device 118 coupled with bus 104 for displaying information.

Referring still to FIG. 1A, display device 118 of FIG. 1A may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. Computer system 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a graphical user interface (GUI) 130 under the direction of a processor (e.g., processor 106A or processors 106A, 106B, and 106C). GUI 130 allows user to interact with computer system 100 through graphical representations presented on display device 118 by interacting with alphanumeric input device 114 and/or cursor control device 116.

Computer system 100 also includes an I/O device 120 for coupling computer system 100 with external entities. For example, in one embodiment, I/O device 120 is a modem for enabling wired or wireless communications between computer system 100 and an external network such as, but not limited to, the Internet. In one embodiment, I/O device 120 includes a transmitter. Computer system 100 may communicate with a network by transmitting data via I/O device 120.

Referring still to FIG. 1A, various other components are depicted for computer system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

Figure 1B:
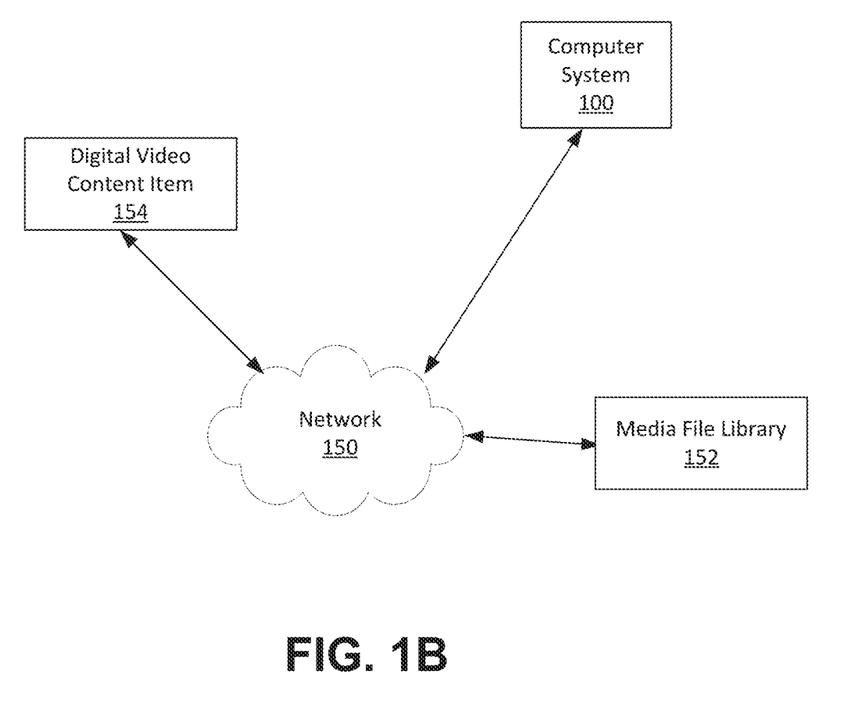
FIG. 1B illustrates an example communication network upon which embodiments described herein may be implemented.

FIG. 1B illustrates an example communication network 150 upon which embodiments described herein may be implemented. FIG. 1B illustrates computer system 100, media content library 152, and media content item 154, all of which are communicatively coupled via network 150. It should be appreciated that computer system 100, media content library 152, and media content item 154, may be implemented as a computer system 100 or as another computer system.

In one embodiment, media content library 152 is a server computer system including a plurality of digital video content items. A media file can be any type of file that can be rendered on an electronic device (e.g., a prerecorded video file). It should be appreciated that any type of media file format can be used in accordance with the described embodiments, including but not limited to Graphics Interchange Format (GIF), WebM, WebP, MPEG-4 (MP4), Animated Portable Network Graphics (APNG), Motion JPEG, Flash video (FLV), Windows Media video, M4V, etc.

Example Adaptive Content Classification of a Video Content Item

Embodiments described herein provide methods and systems for performing adaptive content classification of a video content item. Frames of a video content item are analyzed at a sampling rate for a type of content, wherein the sampling rate dictates a frequency at which frames of the video content item are analyzed. Responsive to identifying content within at least one frame indicative of the type of content, the sampling rate of the frames is increased. Responsive to not identifying content within at least one frame indicative of the type of content, the sampling rate of the frames is decreased. It then determined whether the video content item includes the type of content based on the analyzing the frames.

Figure 2:
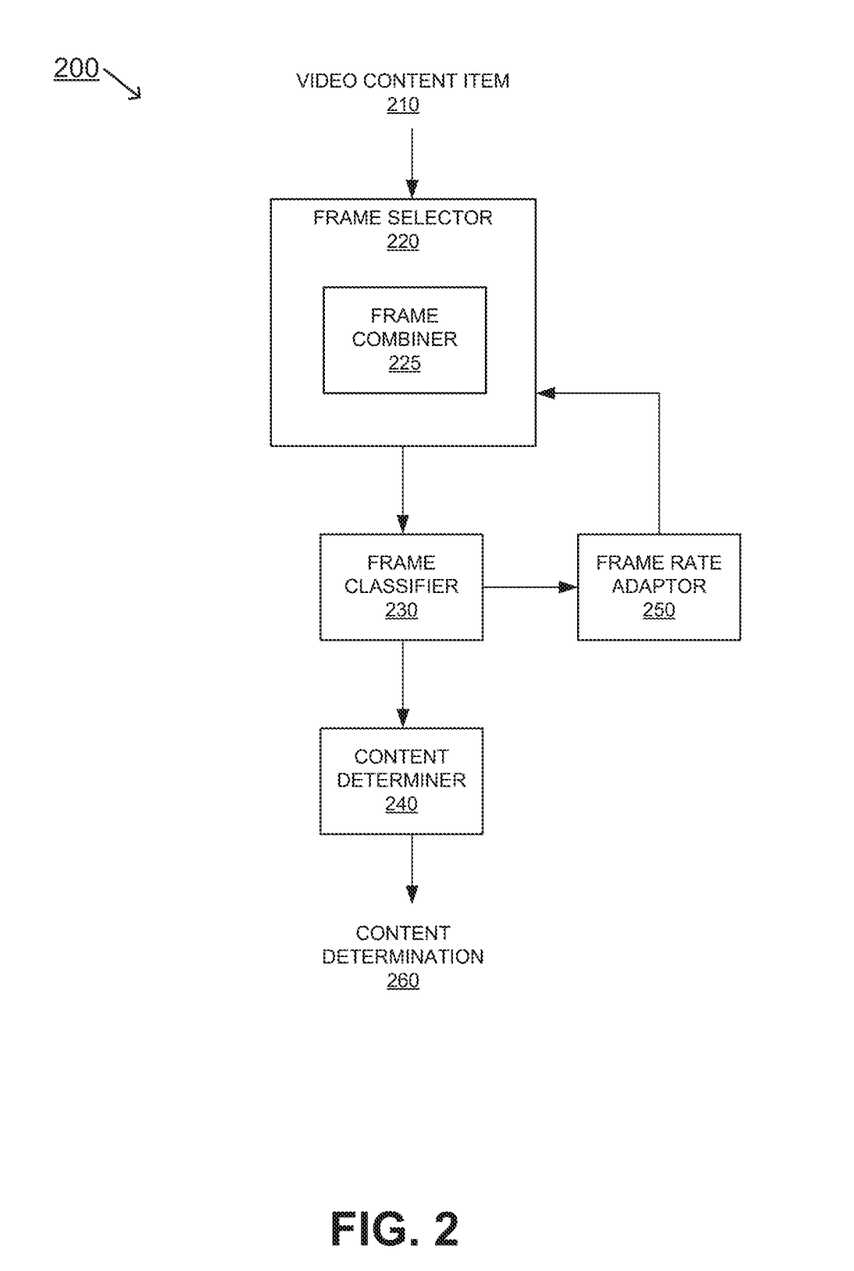
FIG. 2 illustrates an example system for adaptive content classification, according to an embodiment.

FIG. 2 illustrates an example system 200 for adaptive content classification, in accordance with various embodiments. A video content item 210 is received at frame selector 220. In some embodiments, video content item 210 is received from an electronic device. It should be appreciated that the system 200 can be located in the electronic device, a remote computer system, or components of system 200 can be distributed across both the electronic device and a remote computer system.

Embodiments described herein pertain to classification of video content items. In one embodiment, the video content item is a Graphics Interchange Format (GIF) file. While embodiments described herein pertain to GIF files, it should be appreciated that other types of prerecorded media files, such as other types of video files, can be used herein. Moreover, it should be appreciated that any type of video file format can be used in accordance with the described embodiments, including but not limited to GIF, WebM, WebP, MPEG-4 (MP4), Animated Portable Network Graphics (APNG), Motion JPEG, Flash video (FLV), Windows Media video, M4V, etc. It should be appreciated that video content item can be looped (e.g., via a HTML 5 video element or Flash video element) to automatically repeat. In some embodiments, the video content item is a short form looping video file (e.g., less than 60 seconds).

Frame selector 220 is configured to select frames of the video content item for classification. Embodiments described herein provide video content items to at least one content classifier, where the content classifier is configured to automatically identify a particular type of content (e.g., NSFW content, cat videos, football videos, music videos, etc.) Frames of the video content are sampled at frame selector 220 for forwarding to the content classifier, where the sampling rate of frames analyzed by the content classifier is adapted based on the analysis of at least one previous frame of the video content. For instance, rather than check every frame or every key frame of a video content item, the frequency of the frames that are analyzed is adapted based on the characteristics of at least one preceding frame. If a frame is given a low grade of including the particular type of content, the sample rate is increased (e.g., skipping ahead multiple frames or jumping ahead 0.5 seconds), and if a frame is given a high grade of including the particular type of content, the sample rate is decreased or maintained. In some embodiments, once enough frames of a video are indicative of a particular type of content, it is determined that the video content item includes the type of content, and the analysis for the video content item is ceased, allowing the content classifier to process a next video content item.

Frame classifier 230 receives the frame (e.g., a single frame or a combined frame) and performs content classification on the frame for a type of content (e.g., NSFW, facial identification, etc.) The results of the content classification include an indication as to whether the frame includes content of the type for which the classifier is intended to identify. The results may include a positive indicator, a negative indicator, a numeric value representing a likelihood of the frame including the type of content, etc. It should be appreciated that there can be any number of frame classifiers 230, where each frame classifier 230 is for classifying one or more types of content.

Frame rate adaptor 250 receives the results and based at least in part on the results, is configured to adapt the sampling rate of frame selector 220. For example, if frame classifier 230 indicates that a frame does not include the type of content of the classifier, frame rate adaptor can decrease the sampling rate (e.g., from once every ten frames to once every twenty frames), and direct the frame selector 220 to adapt the frame sample rate to the new frame sample rate. In another example, if frame classifier 230 indicates that a frame does include the type of content of the classifier, frame rate adaptor can increase the sampling rate (e.g., from once every ten frames to once every five frames), and direct the frame selector 220 to adapt the frame sample rate to the new frame sample rate.

Figure 3A:
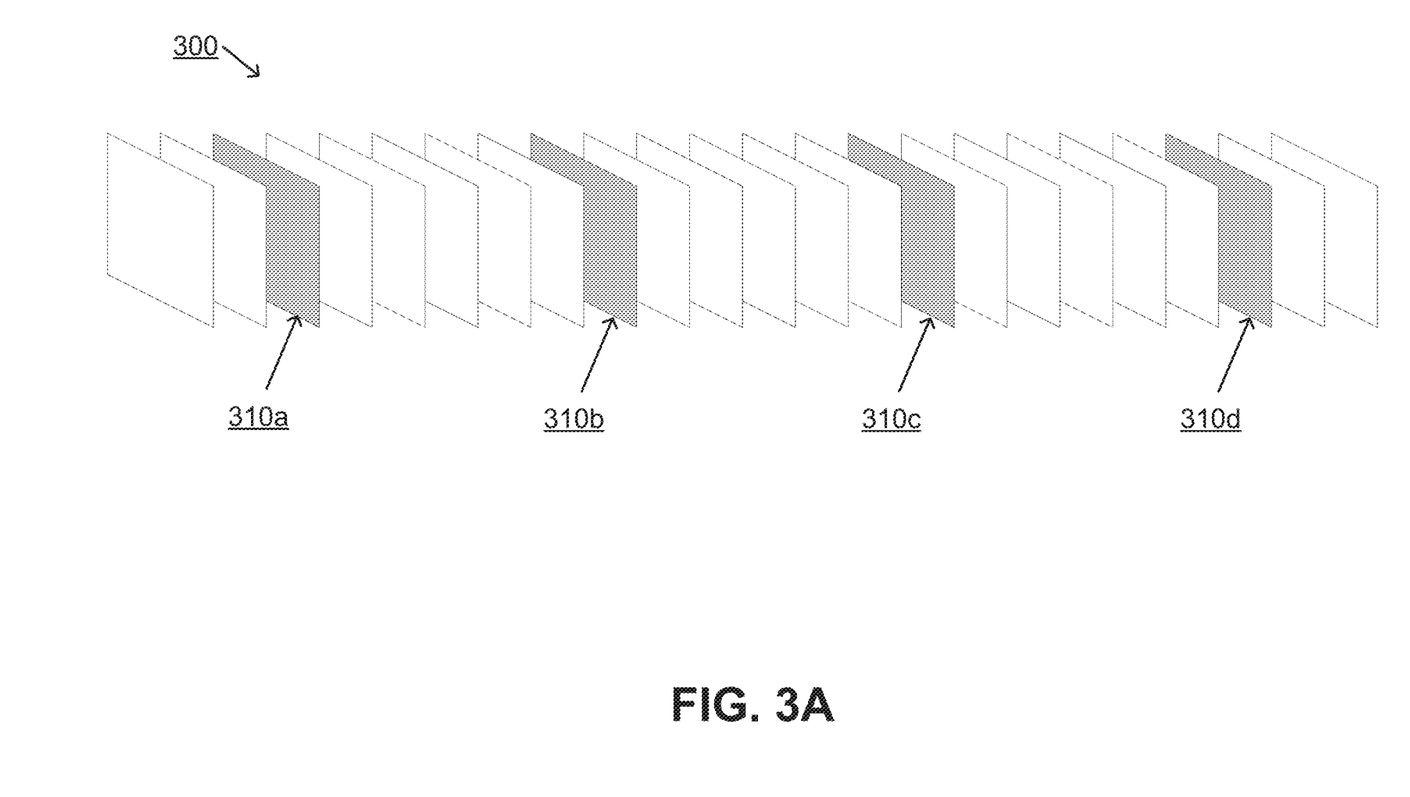
FIGS. 3A through 3C illustrate examples of adapting sampling rates for frames of a video content item, according to an embodiment.
Figure 3B:
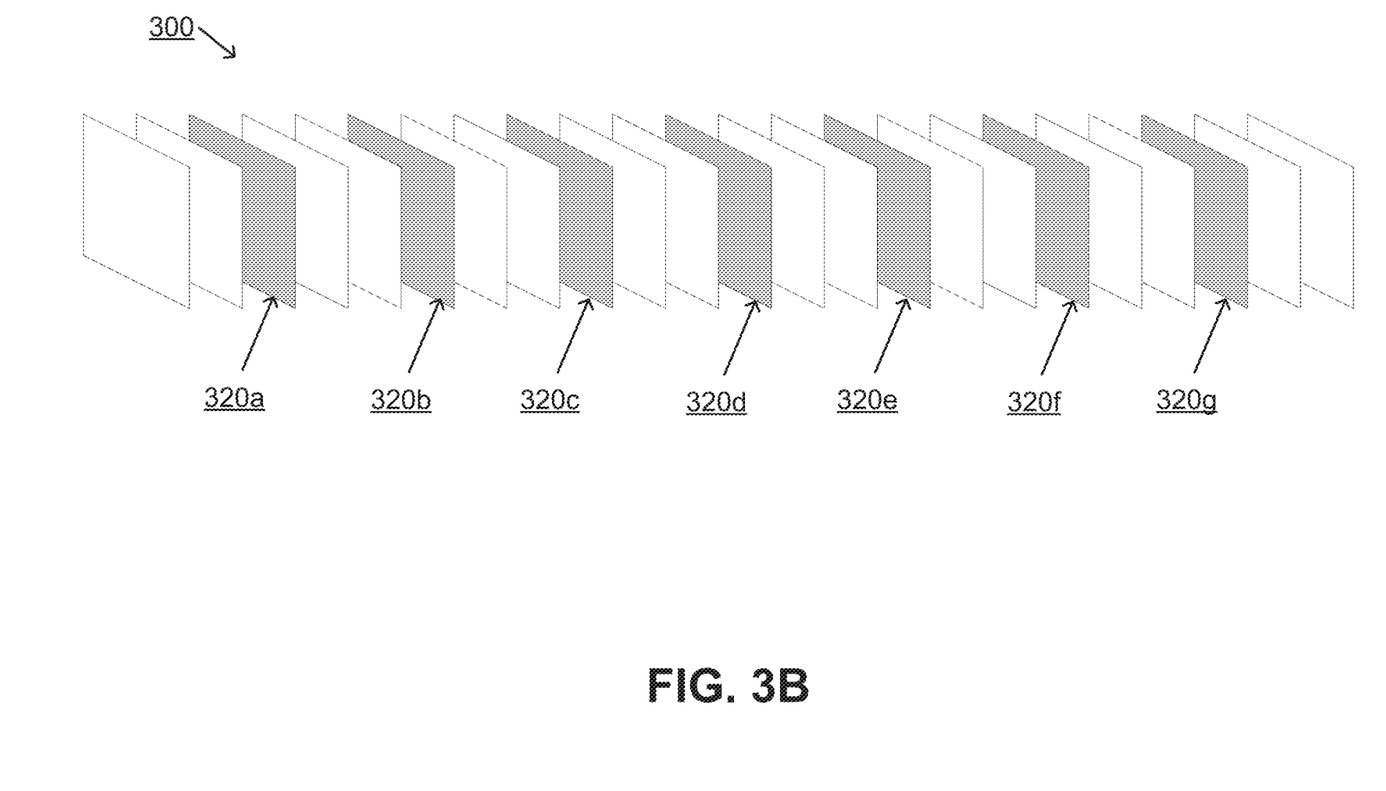
Figure 3C:
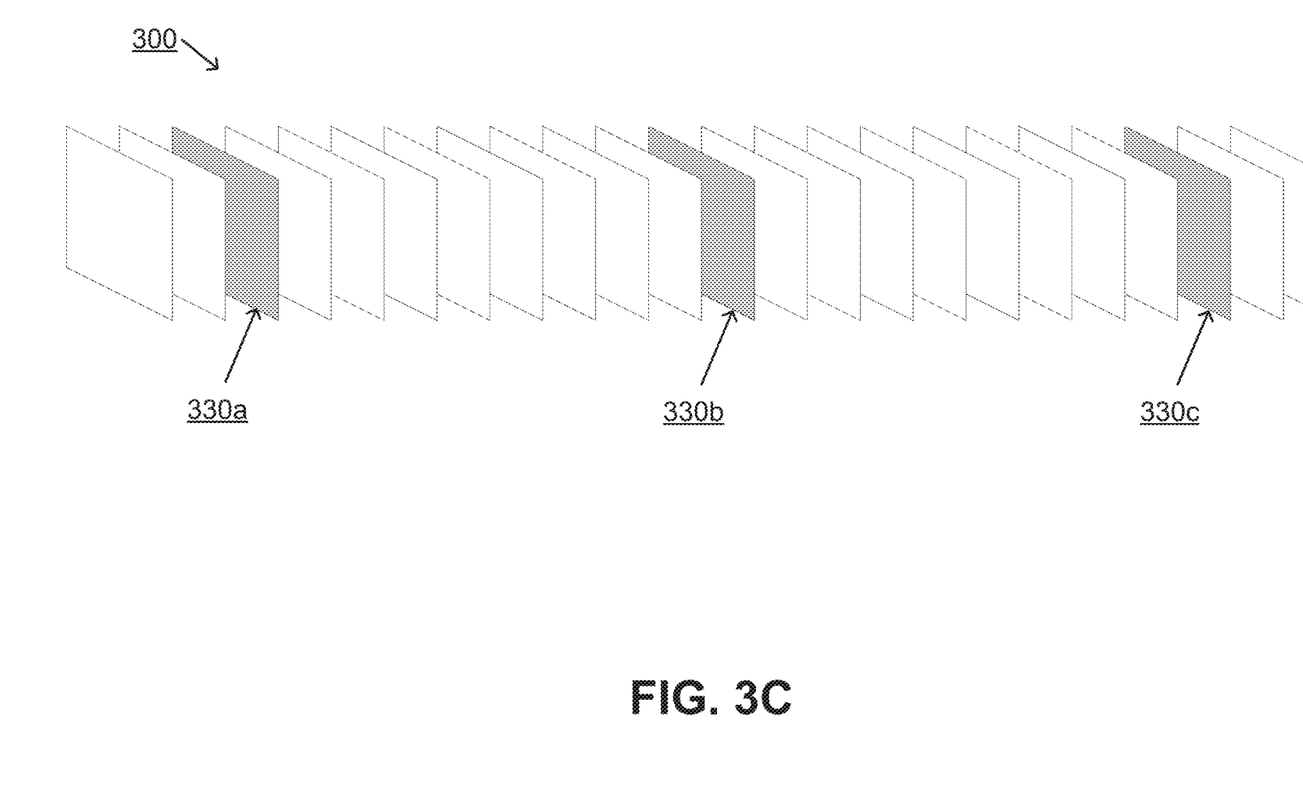

FIGS. 3A through 3C illustrate examples of adapting sampling rates for frames of a video content item 300, according to an embodiment. With reference to FIG. 3A, video content item 300 is shown, where every sixth frame is sampled for content classification. It should be appreciated that any initial sampling rate can be selected, and that the frames can be sampled on any basis (e.g., every nth frames is selected, one frame every 0.10 seconds, etc.) As illustrated, frames 310a, 310b, 310c, and 310d are sampled for forwarding to frame classifier 230 for classification.

Frame classifier 230 is configured to score frames 310a, 310b, 310c, and 310d, the score representing a likelihood of the frame including the type of content for which frame classifier 230 is identifying for classification. If a frame is given a low grade of including the particular type of content, the sample rate is increased, as shown in FIG. 3B. With reference to FIG. 3B, video content item 300 is shown, where every third frame is sampled for content classification. As illustrated, frames 320a, 320b, 320c, 320d, 320e, 320f, and 320g are sampled for forwarding to frame classifier 230 for classification.

If a frame is given a low grade of including the particular type of content, the sample rate is decreased, as shown in FIG. 3C. With reference to FIG. 3C, video content item 300 is shown, where every ninth frame is sampled for content classification. As illustrated, frames 330a, 330b, and 330c are sampled for forwarding to frame classifier 230 for classification.

In one embodiment, frame selector 220 includes frame combiner 225 for combining multiple frames into a single frame for analysis. For example, frame combiner may receive four frames (at a particular sample rate), and combine them into a single 2×2 collage for classification. Frame classifier 230 will then receive the collage including multiple frames, and perform classification of all frames in the collage.

Figure 4:
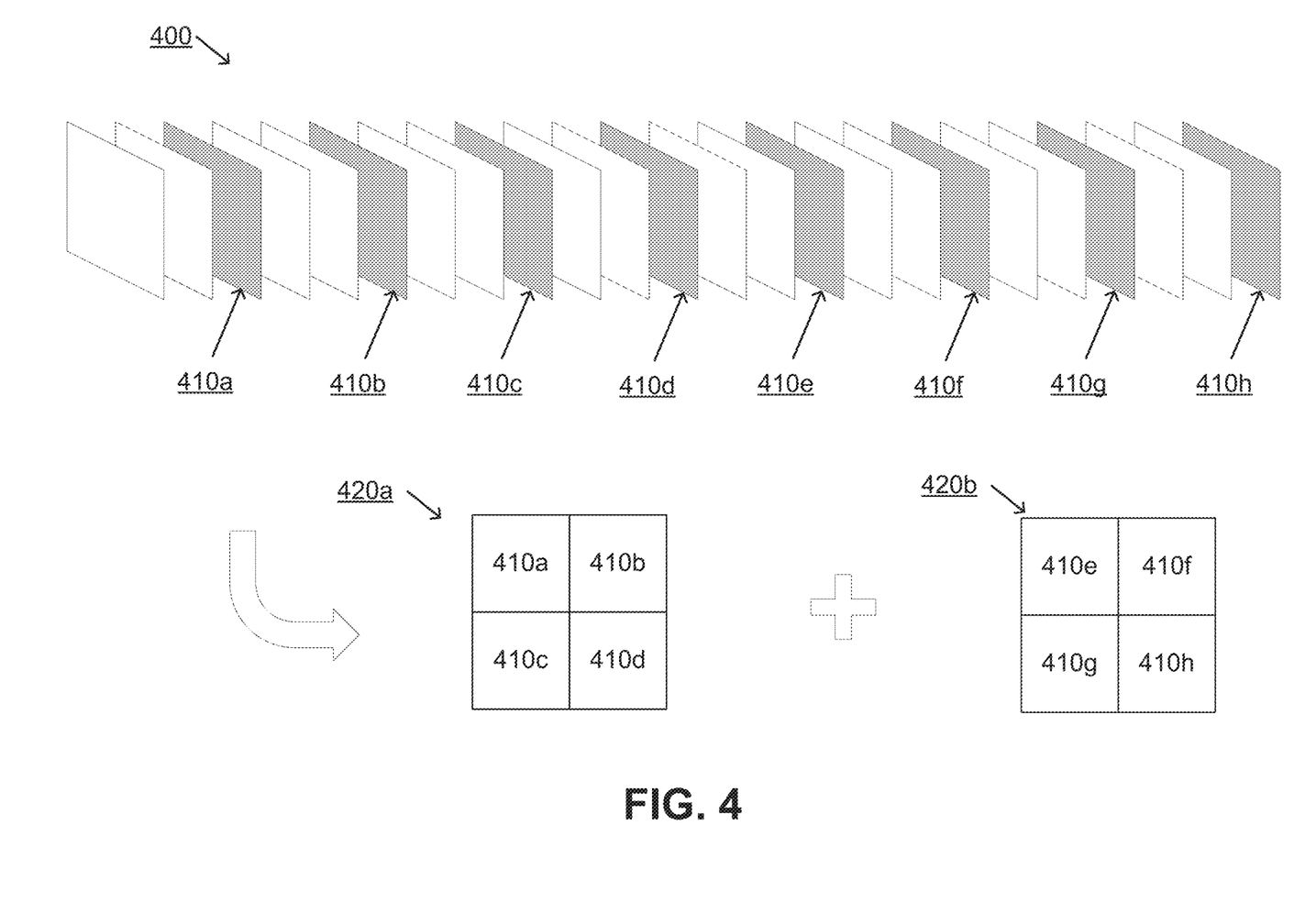
FIG. 4 illustrates an example of a matrix or collage including multiple frames of a video content item, according to an embodiment.

FIG. 4 illustrates an example of a matrix or collage including multiple frames of a video content item 400, according to an embodiment. Embodiments described herein improve the speed of automated content classification by combining multiple frames of a video content item into a collage of frames, such that multiple frames can be classified according to a type of content concurrently. As illustrated, multiple frames from video content item 400 are selected for inclusion in collages 420a and 420b. In the illustrated example, every third frame of video content item 400 is selected, such that collage 420a includes frames 410a, 410b, 410c, and 410d, and collage 420b includes frames 410e, 410f, 410g, and 410h.

It should be appreciated that a matrix or collage of any size can be used (e.g., 2×2 frames, 3×3 frames, 4×2 frames, etc.) In some embodiments, the collages 420a and 420b of frames are provided to the frame classifier 230. Based on the analysis of the collage, the frames of the video content item selected for inclusion within the collage can be adapted. For instance, where the collage is analyzed and it is determined that the collage does not include the particular type of content, the sample rate of frames of the video content item included in the collage can be increased, such that more frames from the video content item are skipped. Where the collage is analyzed and it is determined that the collage includes the type of content, the sample rate of the college can be decreased or maintained such that a higher granularity of frames of the video content item are analyzed.

Content determiner 240 also receives the results of frame classifier 230, and, based on results for at least one frame of video content item 210, makes content determination 260 as to whether video content item includes the type of content for identification by the classifier. For example, if a percentage of the frames include the type of content, or if a threshold number of frames including the type of content is satisfied, content determination 260 is a positive determination that video content item 210 includes the type of content of the classifier. It should be appreciated that the number/percentage of frames can be tuned at content determiner, and may be dependent on the type of content being classified. For example, if only on frame includes an image of a cat, this might not be enough frames to be indicative of a "cat video." In another example, if only one frame includes an NSFW image, since this type of content may be offensive or inappropriate, content determiner 240 may identify such a video content item as NSFW.

As presented above, adaptive content classification of a video content item is important for facilitating the use of digital content. Providing search results that are appropriately classified, primarily in an automated manner, improves the performance of digital content search by providing accurate results. Moreover, by appropriately classifying NSFW content, sensitive content can be avoided for and kept out of search results for audiences that should not have access to such content.

Hence, the embodiments of the present invention greatly extend beyond conventional methods of content classification of video content items. Moreover, embodiments of the present invention amount to significantly more than merely using a computer to perform adaptive content classification. Instead, embodiments of the present invention specifically recite a novel process, rooted in computer technology, adapting the sampling rate of content classifiers based on intermediate results and/or combining multiple frames into a single frame, for providing accurate and computationally efficient content classification. Therefore, accurate search results can be provided for presentation to a user, improving the user experience.

Figure 5:
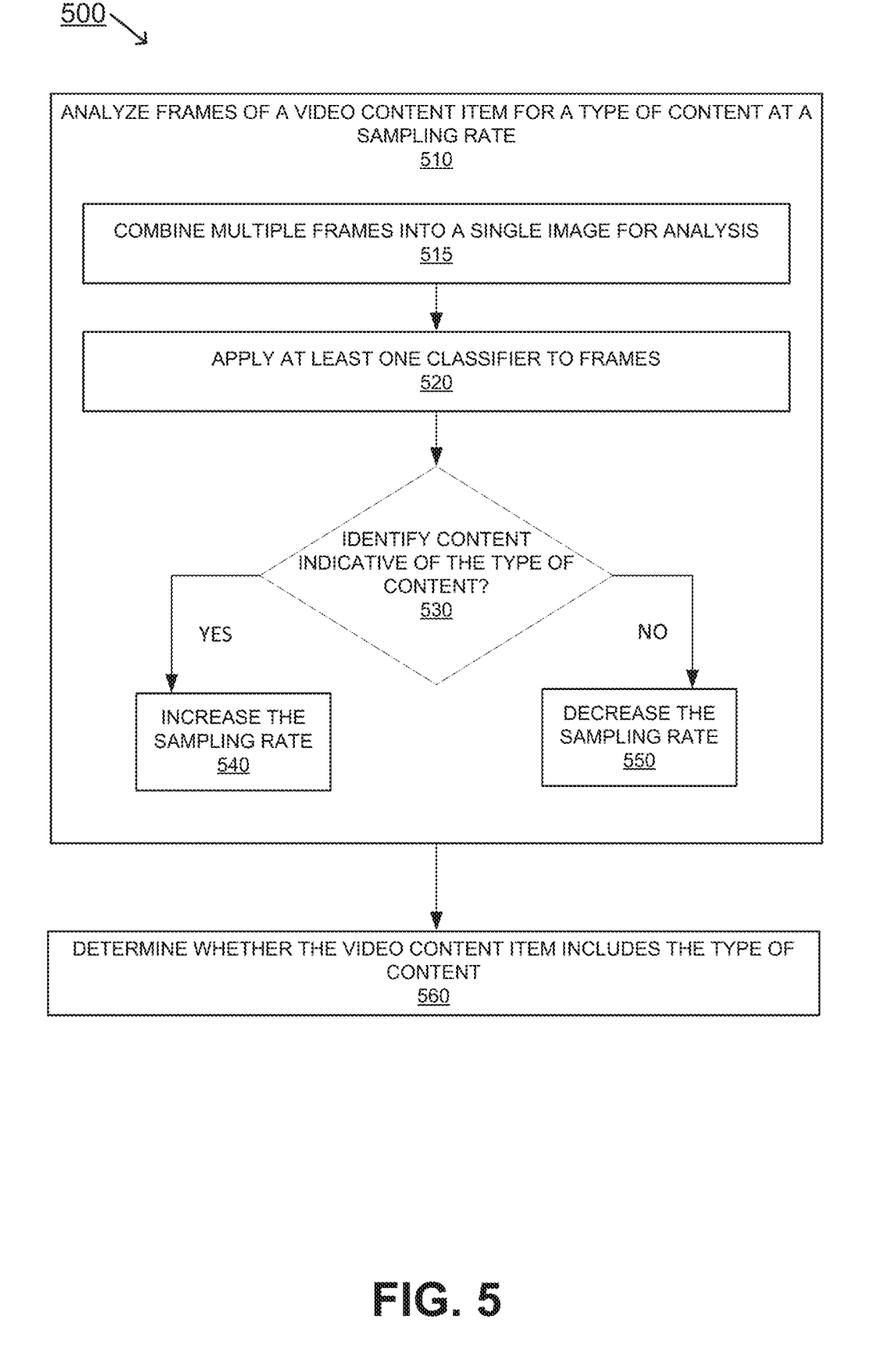
FIG. 5 illustrates flow diagram of an example process for performing adaptive content classification of a video content item, according to various embodiments.

Example Methods of Operation for Performing Adaptive Content Classification of a Video Content Item FIG. 5 illustrates an example flow diagram 500 of an example process for performing adaptive content classification of a video content item, according to various embodiments. Procedures of flow diagram 500 will be described with reference to elements and/or components of various figures described herein. It is appreciated that in some embodiments, the procedures may be performed in a different order than described, that some of the described procedures may not be performed, and/or that one or more additional procedures to those described may be performed. The flow diagram includes some procedures that, in various embodiments, are carried out by one or more processors (e.g., a host processor or a sensor processor) under the control of computer-readable and computer-executable instructions that are stored on non-transitory computer-readable storage media. It is further appreciated that one or more procedures described in the flow diagrams may be implemented in hardware, or a combination of hardware with firmware and/or software.

At procedure 510 of flow diagram 500, frames of a video content item are analyzed at a sampling rate for a type of content. In one embodiment, as shown at procedure 515, a multiple frames are combined into a single collage or matrix of frames for analysis. In one embodiment, the multiple frames of the collage or matrix of frames are collectively analyzed. In one embodiment, as shown at procedure 520, at least one classifier is applied to the frames, wherein the at least one classifier is configured to automatically identify a particular type of content. It should be appreciated that there can be any number of classifiers, where each classifier configured to automatically identify a particular type of content. It should also be appreciated that the classifiers can be applied sequentially or concurrently, or any combination of sequential and concurrent analysis.

At procedure 530, it is determined whether a frame includes content indicative of the type of content. If it is determined that the frame does include content indicative of the type of content, as shown at procedure 540, the sampling rate of frames of the video content item is increased. If it is determined that the frame does not include content indicative of the type of content, as shown at procedure 550, the sampling rate of frames of the video content item is decreased.

At procedure 560, it is determined whether the video content item includes the type of content based on the analysis of the frames. For example, the number of frames including content indicative of the type of content exceeds a threshold, it is determined that the video content item includes the type of content. In one embodiment, provided a determination is made that it is inconclusive that the video content item comprises the type of content, the video content item is forwarded for human review.

Conclusion

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method, performed by one or more processors, for performing content classification of a video content item, the method comprising:
   extracting a plurality of frames from the video content item;
   combining the plurality of frames into single images, each single image comprising a collage of frames; and
   analyzing the single images to identify a type of content in the single images,
   wherein the extracting of a plurality of frames from the video content item comprises extracting frames at a sampling rate that dictates a frequency at which frames are included in the single images, the method further comprising:
   responsive to identifying content within at least one of the single images indicative of the type of content, increasing the sampling rate of the frames; and
   responsive to not identifying content within at least one of the single images indicative of the type of content, decreasing the sampling rate of the frames.

2. The method of claim 1, wherein the sampling rate depends on the particular type of content.

3. The method of claim 1, wherein the single images comprise two by two collages of frames or three by three collages of frames.

4. The method of claim 1, wherein the analyzing of the single images comprises: applying at least one classifier to the single images, wherein the at least one classifier is configured to automatically identify a particular type of content.

5. The method of claim 4, wherein a sensitivity of each of the at least one classifier depends on the particular type of content.

6. A method, performed by one or more processors, for performing content classification of a video content item, the method comprising:
   extracting a plurality of frames from the video content item;
   combining the plurality of frames into single images, each single image comprising a collage of frames; and
   analyzing the single images to identify a type of content in the single images,
   wherein the analyzing of the single images comprises:
   sequentially applying a plurality of classifiers to the single image, wherein each classifier of the plurality of classifiers is configured to automatically identify a particular type of content.

7. The method of claim 1, wherein the analyzing of the single images comprises: concurrently applying a plurality of classifiers to the single images, wherein each classifier of the plurality of classifiers is configured to automatically identify a particular type of content.

8. A method, performed by one or more processors, for performing content classification of a video content item, the method comprising:
   extracting a plurality of frames from the video content item;
   combining the plurality of frames into single images, each single image comprising a collage of frames;
   analyzing the single images to identify a type of content in the single images;
   determining that it is inconclusive that the video content item comprises the type of content; and forwarding the video content item for human review, wherein the determination that it is inclusive is based on a numeric value representing a likelihood of the video content including the type of content.

9. A non-transitory computer readable storage medium having computer readable program code stored thereon for causing a computer system to perform a method for performing content classification of a video content item, the method comprising:
    extracting a plurality of frames from the video content item;
    combining the plurality of frames into single images, each single image comprising a collage of frames; and
    analyzing the single images to identify a type of content in the single images, wherein the extracting of a plurality of frames from the video content item comprises extracting frames at a sampling rate that dictates a frequency at which frames are included in the single images, the method further comprising:
    responsive to identifying content within at least one of the single images indicative of the type of content, increasing the sampling rate of the frames; and
    responsive to not identifying content within at least one of the single images indicative of the type of content, decreasing the sampling rate of the frames.

10. A non-transitory computer readable storage medium having computer readable program code stored thereon for causing a computer system to perform a method for performing content classification of a video content item, the method comprising:
    extracting a plurality of frames from the video content item;
    combining the plurality of frames into single images, each single image comprising a collage of frames; and
    analyzing the single images to identify a type of content in the single images,
    wherein the analyzing of the single images comprises:
        sequentially applying a plurality of classifiers to the single image, wherein each classifier of the plurality of classifiers is configured to automatically identify a particular type of content.

11. The non-transitory computer readable storage medium of claim 9 wherein the sampling rate depends on the particular type of content.

12. The non-transitory computer readable storage medium of claim 9, the method further comprising:
    applying at least one classifier to the single images, wherein the at least one classifier is configured to automatically identify a particular type of content.

13. The non-transitory computer readable storage medium of claim 12, wherein a sensitivity of the at least one classifier depends on the particular type of content.

14. The non-transitory computer readable storage medium of claim 9, the method further comprising:
    determining that it is inconclusive that the video content item comprises the type of content; and
    forwarding the video content item for human review.

15. A computer system comprising:
    a data storage unit; and
    at least one processor coupled with the data storage unit, the at least one processor being configured to perform a method for performing content classification of a video content item, the method comprising:
    extracting a plurality of frames from the video content item;
    combining the plurality of frames into single images, each single image comprising a collage of frames; and
    analyzing the single images to identify a type of content in the single images, wherein the extracting of a plurality of frames from the video content item comprises extracting frames at a sampling rate that dictates a frequency at which frames are included in the single images, the method further comprising:
    responsive to identifying content within at least one of the single images indicative of the type of content, increasing the sampling rate of the frames; and
    responsive to not identifying content within at least one of the single images indicative of the type of content, decreasing the sampling rate of the frames.

16. A computer system comprising:
    a data storage unit; and
    at least one processor coupled with the data storage unit, the at least one processor being configured to perform a method for performing content classification of a video content item, the method comprising:
    extracting a plurality of frames from the video content item;
    combining the plurality of frames into single images, each single image comprising a collage of frames;
    analyzing the single images to identify a type of content in the single images;
    determining that it is inconclusive that the video content item comprises the type of content; and
    forwarding the video content item for human review, wherein the determination that it is inclusive is based on a numeric value representing a likelihood of the video content including the type of content.

17. The computer system of claim 15, wherein the sampling rate depends on the particular type of content.

18. The computer system of claim 15, the method further comprising:
    applying a classifier to the single images,
    wherein the classifier is configured to automatically identify a particular type of content and a sensitivity of the classifier depends on the particular type of content.

* * * * *